United States Patent [19]

Talmadge et al.

[11] Patent Number: 4,807,059
[45] Date of Patent: Feb. 21, 1989

[54] APPARATUS FOR RECEIVING AND SECURELY RETAINING A DEVICE

[75] Inventors: Paul C. Talmadge, Ansonia; David H. Brooks, Wilton, both of Conn.

[73] Assignee: Pitney Bowes Inc., Stamford, Conn.

[21] Appl. No.: 104,129

[22] Filed: Oct. 5, 1987

[51] Int. Cl.[4] .............................................. G11B 15/04
[52] U.S. Cl. ....................................... 360/60; 235/485; 235/486; 269/256
[58] Field of Search .................. 400/144.2, 157.2, 355, 400/357; 437/325, 660; 235/483, 484, 485, 486, 487, 488; 269/256; 360/60, 120, 121, 132

[56] References Cited

U.S. PATENT DOCUMENTS

| | | | |
|---|---|---|---|
| 3,596,061 | 7/1971 | Gechele et al. | 235/486 |
| 3,848,229 | 11/1974 | Perron et al. | 235/382 |
| 4,404,464 | 9/1983 | Moreno | 235/438 |
| 4,449,775 | 5/1984 | dePommery et al. | 439/373 |
| 4,480,181 | 10/1984 | Fisher | 235/486 |
| 4,487,468 | 11/1984 | Fedder et al. | 439/325 |
| 4,493,107 | 1/1985 | Stockburger et al. | 382/58 |
| 4,629,345 | 12/1986 | Suzaki et al. | 400/208 |

Primary Examiner—A. D. Pellinen
Assistant Examiner—Jeffrey A. Gaffin
Attorney, Agent, or Firm—Donald P. Walker; David E. Pitchenik; Melvin J. Scolnick

[57] ABSTRACT

An electromechanical vault cartridge receptacle has an opening for inserting a vault cartridge, the cartridge passing between a pair of laterally biased rollers which continuously engage asymmetrically contoured sided surfaces of the cartridge. A front surface edge of the cartridge bears upon and causes the backwards motion of a movable frame, the motion of which causes top and bottom surfaces of the cartridge to be securely engaged between an opposed pair of horizontally planar cartridge bearing members. The backwards motion of the movable frame also results in roller supporting members to be locked when the cartridge is fully inserted, thereby preventing lateral movement of the rollers. A cartridge ejecting means comprises electromechanical means adapted for engaging a back surface of the movable frame to move the movable frame in a forwards direction, disengaging the cartridge engaging members and unlocking the roller supporting members, whereby the cartridge is pushed back out of the opening.

25 Claims, 4 Drawing Sheets

APPARATUS FOR RECEIVING AND SECURELY RETAINING A DEVICE

FIELD OF THE INVENTION

The present invention relates generally to data storage devices, and, in particular, relates to an electromechanical receptacle for receiving, aligning, securely retaining and ejecting a vault cartridge.

BACKGROUND OF THE INVENTION

It has been known to use portable data storage modules, such as a vault cartridge, in such applications as credit cards and in controllers coupled to a host system.

A particular problem associated with the use of a vault cartridge is that in order to couple data into and out of the cartridge it is often a requirement that the cartridge be accurately aligned with data coupling devices within a host system, the host system storing and retrieving the data within the vault cartridge. Another common requirement is that the vault cartridge be securely retained within the host to prevent its intentional or inadvertent removal from the host system. Such a removal during a time when the host is storing or retrieving data within the cartridge could result in the disruption and the loss of data stored within the cartridge. In those applications were the data represents, for example, valuable accounting data such as in a postage meter device, such a data loss may prove especially disadvantageous.

It is therefore one objective of the present invention to provide a vault receptacle which securely retains a vault cartridge within.

It is therefore a further objective of the present invention to provide a vault receptacle which prevents the intentional or inadvertent removal of the cartridge except at a desired time.

It is a still further objective of the present invention to provide a vault receptacle which locks an inserted vault cartridge within until receiving a signal to eject the vault cartridge.

SUMMARY OF THE INVENTION

The foregoing problems are overcome and the objectives of the invention are realized by an apparatus for receiving and securely retaining a cartridge inserted through an opening provided therein comprising means for engaging a front surface of the cartridge as the cartridge is inserted, the engaging means being movable, in response to the insertion of the cartridge, between at least a first position and a second position; means for engaging at least one horizontal planar surface of the cartridge; and means for activating the cartridge planar surface engaging means, the means for activating being coupled to the front surface engaging means and responsive to the movement thereof for causing the cartridge planar surface engaging means to securely engage the cartridge surface in response to the front surface engaging means moving to the second position.

In accordance with a method of the invention there is provided a method of securely retaining a vault cartridge within a value printing system to prevent the inadvertent or intentional removal of the cartridge, the method comprising the steps of providing the vault cartridge with an asymmetrical horizontally planar shape having a widest portion offset from a transverse centerline of the cartridge and inwardly tapering edges such that a front edge of the module is narrower than a back edge of the module; providing a vault receptacle for retaining the cartridge within, the receptacle having an opening for inserting the cartridge therethrough; inserting the front edge of the cartridge through the opening such that side surfaces of the cartridge pass between a pair of rollers, each of the rollers being coupled to a biased support member for urging the rollers towards one another for continuously engaging the side surfaces of the cartridge, the rollers passing over the widest portion of the cartridge and coming to rest adjacent to the back edge of the cartridge; and locking each of the roller supports to substantially prevent the further motion of the rollers whereby the rest position of the rollers impedes the withdrawal of the cartridge through the opening.

BRIEF DESCRIPTION OF THE DRAWINGS

The foregoing aspects and other features of the invention will become more apparent in the following detailed description of the invention taken in conjunction with the accompanying drawings wherein.

DETAILED DESCRIPTION OF THE INVENTION

Figure 1:
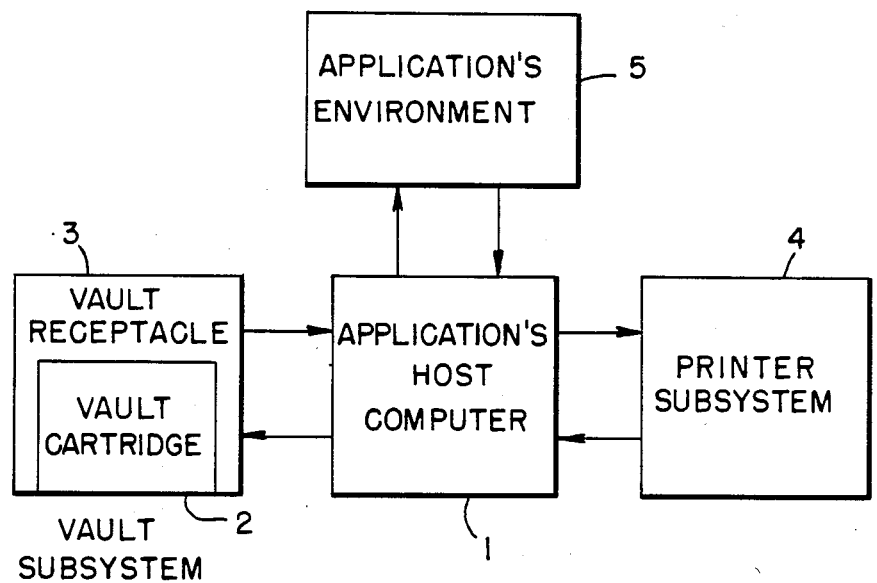
FIG. 1 is a block diagram showing a portable data storage module, or vault cartridge, coupled to an application host computer through a vault receptacle.

Referring now to FIG. 1 there is shown in block diagram form a system having an application's host computer 1 bidirectionally coupled to a vault subsystem which comprises a vault cartridge 2 coupled to a vault receptacle 3. Application's host computer 1 is also bidirectionally coupled to a printer subsystem 4 and is further bidirectionally coupled to an application's environment 5. In general, host computer 1 may be any data processing means operable for executing an application program, such as a computer operable for executing a postage dispensing application program. The application's environment 5 may be a user of the host computer or may also be another computing system which is coupled to the application's host computer and is operable for transmitting data to and receiving data from the application's host computer. The block designated as 5 may comprise a familiar CRT screen and a keyboard which are both operable for providing an operator with a means for interacting with the application's host computer 1. Vault cartridge 2 may comprise a data storage means operable for storing data generated by the application's host computer 1. The vault cartridge 2 may also comprise, for example, ascending and descending postage registers which are maintained within the cartridge 2 in a secure environment. The vault receptacle 3 may be an electromechanical mechanism having electronic and electrical power coupling means for coupling data into and out of the vault cartridge 2 and also for providing operating power thereto. In accordance with the invention, the vault cartridge 2 may be detachably coupled to the vault receptacle enabling the cartridge to be removed and inserted as desired by a user or some operator of the system. Printer subsystem 4 may be any suitable printing means which is operable for receiving data from the application's host computer for printing. The printer subsystem 4 may be a printer operable for printing postage indicia which are representative of a monetary value of postage. Printer subsystem 4 may be a secure printer system which is bidirectionally coupled to the application host computer 1 for receiving therefrom and transmitting thereto security codes such as cryptographic codes which enable the printer subsystem 4 to print. Although shown as a plurality of separate blocks, it should be realized that the application's host computer 1, the vault cartridge, the vault receptacle 3 and the printer subsystem 4 may all be contained within a single system. That is, these blocks may not be independent systems but the functions thereof may all be incorporated within one system. Similarly, different combinations of the blocks are possible such that the application's host computer 1 and the vault system may comprise one system having a printer subsystem coupled thereto through a suitable cable or some other data transmission means.

As an example of the operation of such a system, the application's host computer may receive a request from the application's environment 5, such as a request from a user to print a postage indicia representative of a monetary value of postage. In response thereto, the application's host computer 1 may interrogate the vault cartridge 2 within vault receptacle 3 to determine if the descending register securely contained therein indicates a sufficient value of postage funds to print the desired value of postage. Upon receiving an indication from the vault cartridge 2 that such funds are available the application's host computer may thereafter send data to the printer subsystem 4 which causes the printer subsystem 4 to print the postage indicia indicating the desired monetary value. Of course, such a system as depicted in FIG. 1 may be adapted to a wide number of applications such as the printing of lottery tickets or the printing of tax stamps, such as the stamps affixed to liquor and cigarettes.

Figure 2:
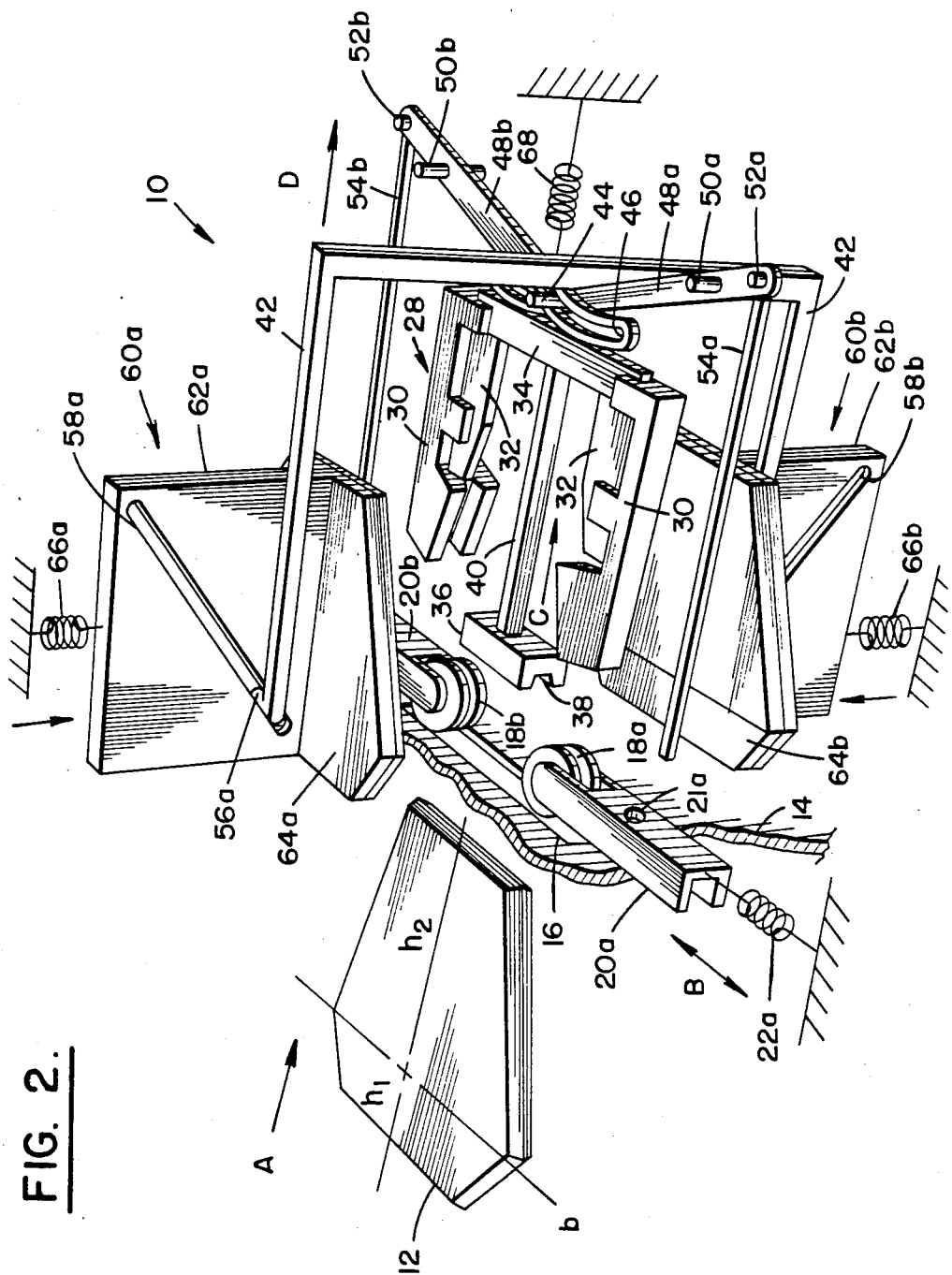
FIGS. 2, 3, 4 and 5 are each a side elevational view of the receptacle in various stages of engagement with a vault cartridge.

Referring now to FIGS. 2, 3, 4 and 5 there is shown a portion of the vault subsystem of FIG. 1. As can be seen, the vault subsystem is comprised of a vault receptacle 10 and a vault cartridge 12. In the view of FIG. 2 the vault cartridge 12 is positioned to be inserted within the receptacle 10 in the manner indicated by the arrow A. A portion of receptacle outer wall 14 is shown having an opening 16 made therein, the opening 16 having dimensions suitable for accommodating at least the widest transverse dimension and also the thickness of the cartridge 12 as the cartridge 12 is inserted therethrough. Disposed on either side of the interior portion of opening 16 are a pair of roller means comprising rollers 18a and 18b and roller supporting members 20a and 20b. Each of the rollers 18 has a shaft (not shown) passing through a centrally disposed opening, each shaft being supported by the roller supporting members 20a and 20b, respectively. Supporting members 20a and 20b are each provided with a lateral biasing means, only the biasing means associated with member 20a being shown. The biasing means may be a spring member 22a or any other suitable flexible compression means which is operable for urging member 20 and an attached roller 18 against the sides of the module 12 in a direction substantially perpendicular to a longitudinal centerline of the cartridge 12.

Figure 6:
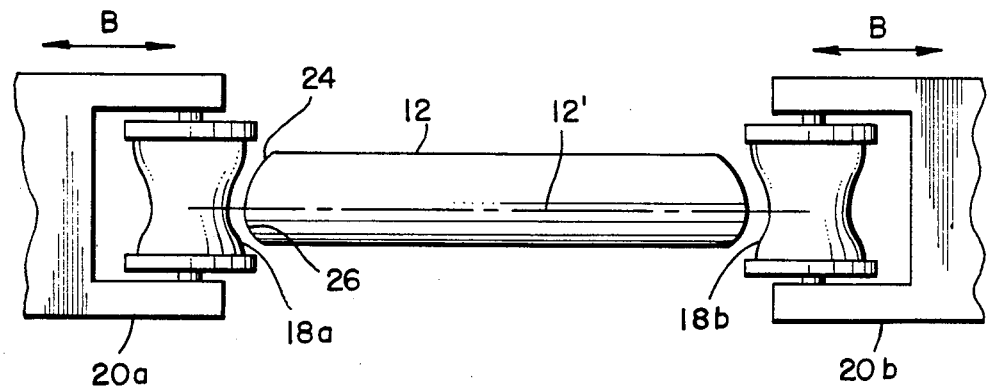
FIG. 6 shows a front edge of a vault cartridge having asymmetrical radiussed side edges in conjunction with opposing rollers having a corresponding shape.

Referring to FIG. 6 in conjunction with FIG. 2 there is shown an end view of one possible embodiment of the cartridge 12, the view looking out through the opening 16. As can be seen, the cartridge 12 is asymmetric about a horizontally disposed plane 12' passing through the center thereof. The rollers 18a and 18b have an asymmetrical contour the shape of which is predetermined to match the asymmetrical shape of cartridge 12. As can be seen, an upper portion 24 of cartridge 12 has a radiussed edge having a larger radius of curvature than a lower portion 26. Thus, it can be realized that when the cartridge 12 is inserted through opening 16 in the direction shown by the arrow A of FIG. 2, that the side surfaces of the cartridge will engage the contoured rollers 18, thereby allowing the entry of the cartridge 12. If the cartridge 12 were rotated 180 degrees about a longitudinal axis in the view of FIG. 6, it can be appreciated that the shape of the cartridge in conjunction with the contoured rollers would impede the entry of the cartridge. It can further be appreciated from FIG. 2 that due to the asymmetrical shape of the cartridge as viewed from the top thereof, that the cartridge must be inserted with the narrower end portion first. If the wider end portion were inserted first the initial spacing of the rollers would not permit the cartridge to be inserted through the opening 16. Thus, it can be appreciated that if the cartridge is provided with an asymmetrical shape in both horizontally and vertically disposed central planes, that the cartridge can be inserted in only one predefined orientation into the receptacle 10. For example, the cartridge 12 may have an overall top surface shape defined by two trapezoids having a common base (b) and unequal heights ($h_1$ and $h_2$). In a preferred cartridge embodiment b has a length of approximately 3.5 inches while $h_1$ and $h_2$ are approximately 1.0 inch and 3.5 inches, respectively. This feature of the invention will be more fully described below.

It should be realized that cartridge 12 will typically comprise data coupling means which interface with corresponding data coupling means (not shown) in the receptacle 10. Cartridge 12 may also comprise input power coupling means which interface with corresponding output power coupling means (not shown) in the receptacle 10. Thus, the insertion of the cartridge in a predefined orientation is desirable in that the alignment of the data coupling and power coupling means is facilitated.

Returning now to FIG. 2 it can be seen that the receptacle 10 also comprises a cartridge stop means such as a fixed frame member 28 which is comprised of a forward and a rear side frame member 30 and 32, respectively. Members 30 and 32 are joined at one end to a cross support member 34 which maintains the spacing and alignment between the frame members 30 and 32. As can be seen, the members 30 and 32 have a tapered inner opening which has an angle of inclination which is substantially equal to the angle of inclination of the side edges of the cartridge 12, thereby accurately aligning the cartridge 12 between opposing members 30 and 32 when cartridge 12 is fully inserted. The fixed frame member 28 may be fixed to a portion of a supporting structure, not shown, within the receptacle 10 to maintain a fixed distance between the frame member 28 and the rollers 18.

Receptacle 10 also comprises a cartridge front surface engaging member 36 which has a slot 38 made in a front face thereof. The slot 38 may have a contour which matches the variably radiussed contour of the end of vault cartridge 12. Thus, it can be seen that when the cartridge 12 is inserted within the receptacle 10 the front surface of the cartridge will engage the slot 38 and as the cartridge is further inserted through the opening 16 that the cartridge will bear upon the front surface engaging member 36 such that the member 36 will be urged in a direction shown by the arrow C. Attached to the member 36 may be a bar-like supporting member 40 which is attached at an opposite end thereof to a movable frame member 42. Movable frame member 42 comprises a rotational coupling means such as a vertical pin 44 affixed to a central portion, the pin 44 passing through elongated curved slots 46 made within a pair of movable arm members 48a and 48b. Each of the members 48a and 48b is also provided with a rotational coupling means such as a pin 50a and 50b, respectively, each of the pins 50 engaging an opening within a supporting frame (not shown) such that the arms 48 rotate about their respective pins 50. Each of the arm members 48 is further provided with another rotational coupling means such as a pin 52a and 52b, respectively, the pins 52 being disposed at the ends of the arm members 48 and passing through an opening made therethrough. Rotatably coupled to each of the arm members 48a and 48b by one of the the pins 52 is a locking member 54a and 54b, respectively, the operation of which will be described in detail hereinafter.

Movable frame member 42 may be generally U-shaped, having ends which terminate in a slot engaging member, such as a right angle member 56, the member 56 slideably engaging slots 58a and 58b made within an upper and a lower cartridge compression means 60a and 60b, respectively. Each of the compression means 60 has a vertical upstanding member 62 and a horizontally disposed planar bearing member 64. The bearing member 64 may have a shape which is similar to that of the cartridge 12. Each of the compression means 60 is further provided with a biasing means, such as a spring member 66, which exerts a force upon the compression means 60 to urge the members 64 toward one another, thereby compressing the cartridge 12 therebetween when the cartridge is fully inserted and seated within fixed frame member 28. Movable frame means 42 is also provided with a biasing means, such as a spring member 68, which is operable for being compressed when the movable frame member is moved in the direction of arrow D, this movement being due to the force exerted by the cartridge 12 upon the end engaging member 36, as indicated by the arrow C.

Figure 3:
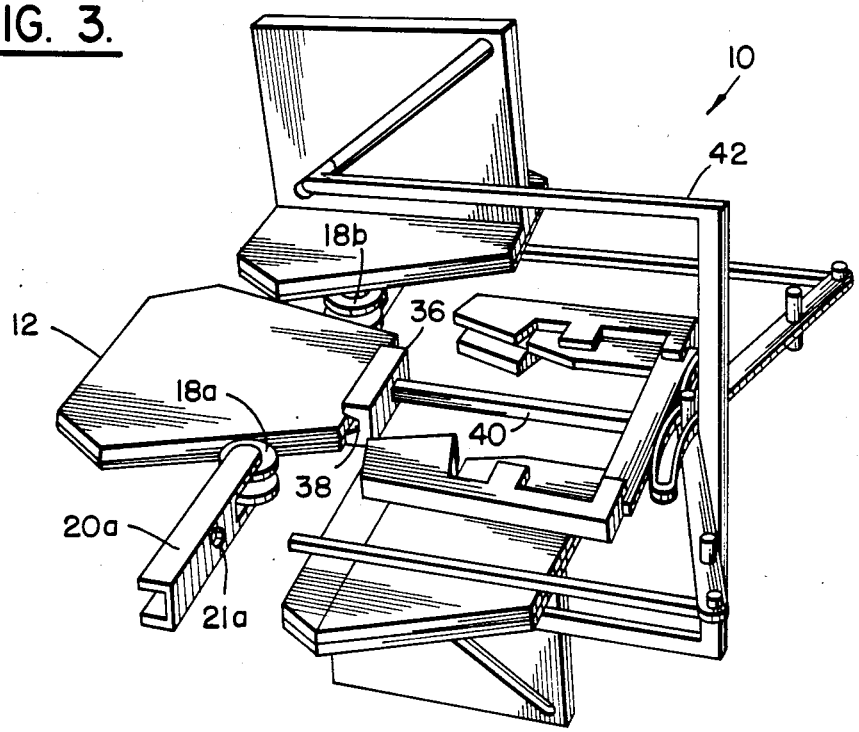
Figure 4:
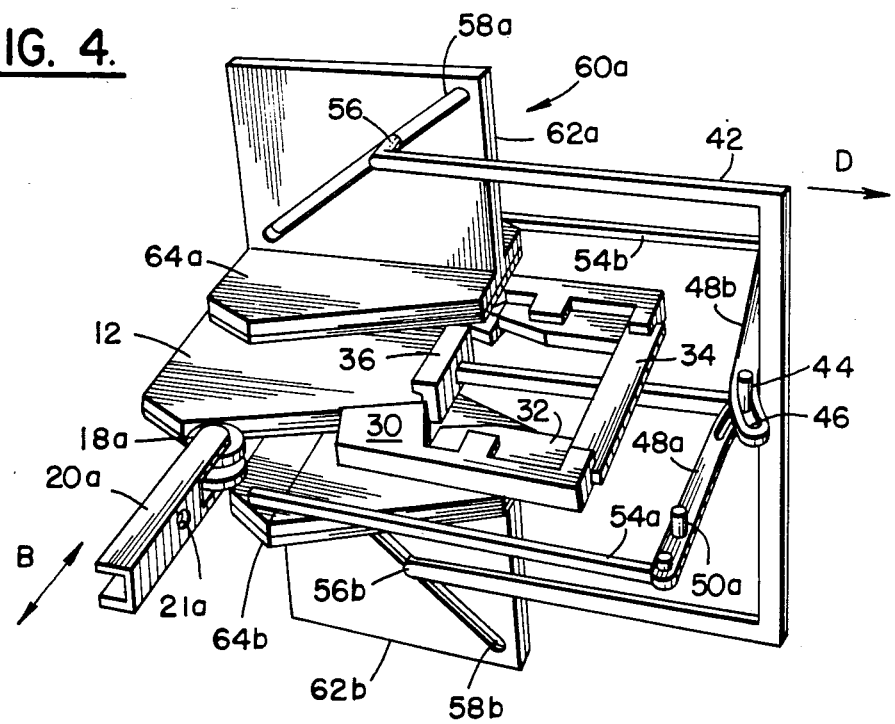
Figure 5:
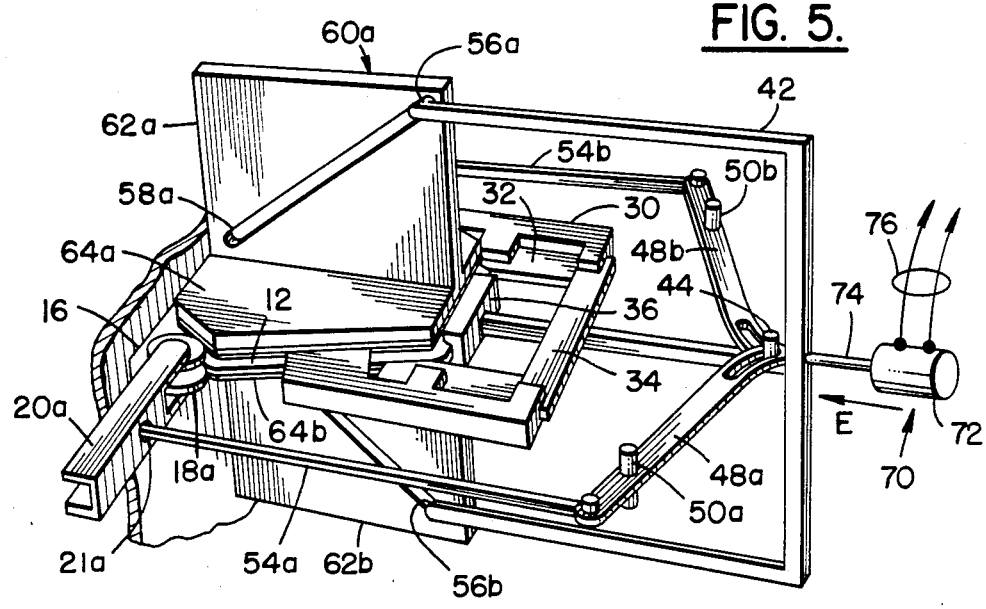

The foregoing aspects of the invention can be clearly seen in FIGS. 3, 4 and 5 which illustrate in a consecutive time sequence the operation of the vault receptacle 10 as the vault cartridge 12 is inserted therein. In FIGS. 3, 4 and 5 certain elements shown in FIG. 2 have been eliminated in order to more clearly illustrate the operation of the apparatus. For example, the various biasing means are not shown and, also, the opening 16 within the wall 14 may not be shown.

As can be seen in FIG. 3 the front edge of vault cartridge 12 has been inserted through the opening 16 (not shown) until the front edge of the cartridge 12 has engaged the slot 38 within the member 36. The rollers 18 have moved apart to accommodate the cartridge 12, the springs 22 exerting an inwardly directed force on roller supporting members 20 to urge the rollers against the cartridge side surface.

Referring now to FIG. 4, it can be seen that the vault cartridge 12 has been more fully inserted within the receptacle 10. That is, the cartridge 12 has been inserted up to the point where the rollers are about to pass over the widest portion of the cartridge 12. This has resulted in the lateral movement of the roller supporting members 20 to approximately their widest spacing one from another. At this time it can be seen that the engaging member 36 and the movable frame 42 have moved in a direction away from their original positions as shown in FIGS. 2 and 3. The movement of movable frame 42 results in the rotation of the arms 48 about the pins 50. The ends of arms 48 nearest to frame 42 also rotate about the pin 44 which passes through the elongated slots 46. This rotation further results in the locking members 54 moving in a direction opposite to the movement of frame member 42. That is, locking members 54 have moved towards the roller supporting members 20. Due to the lateral motion of the roller supporting members 20 a pair of locking arm engaging holes 21 are not yet aligned with the ends of locking members 54. As can be further seen, due to the direction of motion of movable frame member 42 the upper right angle portion 56 is moving upward along the slot 58. The springs 66, it should remembered, exert a compressive force upon each of the compression means 60, that force being in a direction urging the bearing members 64 towards one another.

Referring now to FIG. 5 there is shown the position of the various components of the receptacle 10 when the cartridge 12 has been fully inserted therein. As can be seen, the widest portion of the cartridge has passed the rollers 18, the rollers 18 thereafter, under the influence of springs 22, have moved back towards one another as they ride over the inwardly tapering back portion of the cartridge 12. Having reached this position, the openings 21 are aligned with the ends of locking members 54 which, due to the continued forward movement of arms 48, have seated within the openings 21. Compression means 60a and 60b are now also fully engaged, the bearing member 64a bearing upon a top surface of the vault cartridge 12 while the member 64b bears against the bottom surface of the cartridge 12. To facilitate this operation of bearing members 64, each may comprise a layer of compressible foam or rubber-like material the resilience of which permits the bearing members 64 to tightly compress the cartridge 12 therebetween. Such a compressive engagement is especially desirable if the bearing members also comprise data coupling means for coupling data into and out of the cartridge 12.

It can be appreciated that when the cartridge 12 is fully inserted within the receptacle 10 that any attempt by an operator to remove the cartridge through the opening 16 would be extremely difficult. Inasmuch as bearing members 64 have substantially covered the entire upper and lower surface of the cartridge 12, there is very little surface area, if any at all, with which to grasp the cartridge 12 in order to attempt to retract it from the receptacle 10. Also, due to the compressive force exerted by the springs 66, the cartridge 12 is held firmly between the two bearing members 64. Also, inasmuch as locking members 54 are seated within openings 21, lateral movement of rollers 18 is substantially prevented. Due to the shape of cartridge 12, some lateral movement of rollers 18 is necessary to remove the cartridge 12 in order to cause the rollers to pass over the widest part of cartridge 12. As can be seen, the final rest position of the rollers is on the back surface of the cartridge 12 behind the widest portion of the cartridge. Hence, removal of the cartridge 12 when the cartridge 12 is fully inserted cannot be accomplished by an operator without the activation of a cartridge ejection means, such as a linear motion solenoid 70.

As can be seen in FIG. 5 solenoid 72 is comprised of a body 72 and a spring loaded plunger 74 which, when the solenoid 70 is energized by a suitable voltage through leads 76, moves in a direction as indicated by the arrow E. A terminal portion of plunger 74 comes into contact with and exerts a force upon the movable frame 42, causing the frame 42 to move in a forward direction towards opening 16. This forward movement of frame 42 causes a retraction of locking members 54, disengaging members 54 from openings 21 and thereby releasing roller supports 20 for lateral motion. The forward motion of frame 42 also results in the forward motion of end engaging member 36 and also the motion of compression members 60 in a direction apart from one another, thereby releasing cartridge 12. Cartridge 12 is subsequently pushed back out of opening 16 in a reverse manner to the operation of receptacle 10 as shown and described in FIGS. 3, 4 and 5.

Of course, the cartridge ejection means may be any suitable mechanical or electromechanical device, such, as a linear motion stepper motor or a conventional AC or DC motor mechanically coupled to a mechanism suitable for exerting a force on movable frame 42 which results in the forward motion of the frame and the subsequent ejection of vault cartridge 12.

In accordance with one aspect of the invention the removal, or ejection, of vault cartridge 12 can be accomplished by the entry of a suitable command into the application's host computer by a user. In response to such a command the computer 1 may activate, in a well known manner, the cartridge release means, such as by causing a suitable voltage to be applied to leads 76 through a digitally controlled switch. After ejection of the cartridge, the voltage may be removed, resulting in the retraction of the spring loaded plunger 74.

As can be realized, such an ejection command may be entered into application's host computer 1 in an encrypted or otherwise secret form, thereby allowing only certain users of the computer 1 the ability to eject the cartridge 12. The entry of an ejection command also ensures that the cartridge 12 cannot be removed during a time when the computer 1 is actively storing data within for retrieving data from the cartridge. For example, if such a command is received by computer 1 during a time when data is being stored within the cartridge 12, the computer 1 is enabled to delay the ejection of the cartridge until the data storage operation is completed.

As has been stated, the use of the invention may prove advantageous in a number of different types of systems. One such system is a value printing system such as a system operable for the printing of postage, or a system operable for printing tax stamps or tickets for entertainment events.

In a postage printing system, for example, it is a requirement that the value of postage printed or otherwise dispensed be accurately accounted for. This postage accounting data is typically maintained in ascending and descending registers, the registers typically being stored within a non-volatile data storage device. In order to recharge the postage meter with funds, the ascending register is normally cleared while the descending register is charged with the funds. This recharging is typically accomplished at a postal facility by physically removing the entire postage meter to the facility.

As can be appreciated, the use of the invention permits a data storage module, such as the vault cartridge, to be decoupled from the application's host computer the computer 1 also being coupled to a postage indicia printing device. The cartridge 2 may be conveyed to a recharging facility, perhaps by mailing the cartridge, where the cartridge is recharged with postal funds. That is, data representing postal funds is stored within the memory means of the cartridge 2. The recharged cartridge 2 may thereafter be inserted into the vault receptacle 3 to resume the printing of postage. Due to the secure locking nature of receptacle 3, the cartridge 2 may not be inadvertently or intentionally removed during a time when the computer 1 is storing or retrieving the valuable accounting data. Furthermore, physical access to the cartridge 2 may only be gained by an operator or operators who are cognizant of the specific command which is interpreted by the computer 1 as a command to release, or eject, the cartridge. Also, the self-aligning nature of the cartridge and receptacle ensures accurate alignment of the aforementioned data and power coupling means, thereby further ensuring the integrity of the valuable data stored within the cartridge 12.

It should be realized that an illustrative embodiment only of the present invention has been provided above and that a number of modifications to this illustrative embodiment may become apparent to those skilled in the art. For example, although there has been shown a pair of opposed compression means 60, each of which moves inwardly in response to the backwards motion of fixed frame means 42, it can be appreciated that one of the bearing members 64 may be fixed adjacent to a surface of the cartridge while the other bearing member moves as described above. However, it may be preferable to provide for the aforedescribed motion of both bearing members 64 to avoid any friction related wear upon a surface of the cartridge due to sliding the cartridge, during insertion and removal, over a fixed bearing member.

Therefore, the embodiment disclosed herein is not meant to limit the invention, instead the invention is meant to be limited only as defined by the appended claims.

What is claimed is:

1. Apparatus for receiving and securely retaining a device having a front surface, opposing side surfaces, and a horizontal planar surface, when the cartridge is inserted through an opening provided therein, comprising:

means for engaging a front surface of said device as said cartridge is inserted, said front surface engaging means being movable, in response to said insertion of said device, between at least a first position and a second position;

means responsive to the insertion of said device for continuously engaging the opposing side surface of said device as said device is inserted, said side surface engaging means being operable for movement along an axis substantially perpendicular to a longitudinal centerline of said device, means for engaging at least one horizontal planar surface of said cartridge; and means for activating said planar surface engaging means, said means for activating being coupled to said front surface engaging means and responsive to said movement thereof for causing said planar surface engaging means to securely engage the device planar surface in response to said front surface engaging means moving to said second position.

2. The apparatus of claim 1 further comprising:
means for locking said side surface engaging means to prevent said movement of said side surface engaging means, said locking means being coupled to said activating means for locking said side surface engaging means when said front surface engaging means moves to said second position.

3. The apparatus of claim 2 wherein said side surface engaging means comprises a pair of roller supporting members and a pair of opposed rollers each of which is journaled for rotation on one of said roller supporting members, and biasing means coupled to each of said roller supporting members for urging one of said rollers against one of said side surfaces of said device.

4. The apparatus of claim 2 for receiving and securely retaining a device having at its rear a portion whose width measured between its side surface along a direction parallel to said substantially perpendicular axis is reduced compared with that of adjacent more forward device portions, said surface engaging means engaging said reduced width device portion when said front surface engaging means moves to said second position.

5. The apparatus of claim 3 wherein said device has an asymmetrical side surface contour and wherein each of said rollers has a corresponding asymmetrical side surface contour for allowing said device to be inserted between said rollers in only a predetermined orientation of said device.

6. The apparatus of claim 1 further comprising:
means for stopping said device from being inserted beyond a predetermined position relative to said opening, said stopping means being disposed at the predetermined position.

7. The apparatus of claim 6 wherein said predetermined position of said stopping means is determined such that said stopping means stops said further insertion of said device when said front surface engaging means moves to said second position.

8. The apparatus of claim 1 wherein said planar surface engaging means comprises a top surface engaging member and an opposed bottom surface engaging member, both of said top and bottom surface engaging members being coupled to said activating means for compressively engaging a top and a bottom surface of said device.

9. The apparatus of claim 8 wherein each of said top and said bottom surface engaging means have a shape substantially identical to the shape of said device top surface and said device bottom surface, respectively, and wherein each of said top and said bottom surface engaging means are comprised of a resilient material whereby said device is securely retained therebetween.

10. The apparatus of claim 1 wherein the side surface engaging means are mounted to engage and follow the surface of a device having tapered sides.

11. A receptacle for receiving, aligning and retaining a device having a front surface, opposed side surfaces, and top and bottom surfaces, when the device is inserted within, comprising:
a plurality of roller means each of which comprises a roller and a roller supporting member, each of said rollers being disposed to continuously engage a side surface of the device as said device is inserted into said receptacle, each of said supporting members being adapted for lateral movement relative to said side surfaces of said device for urging said rollers against said side surfaces, said device passing between said rollers as said device is inserted;
device front surface engaging means disposed to engage a front surface of said device as said device passes between said rollers;
movable frame means fixedly coupled to said front surface engaging means such that as said front surface of said device engages and bears upon said front surface engaging means said movable frame means moves in a backward direction away from said roller means;
a plurality of movable arm means each of which is rotatably coupled at a first end thereof to said movable frame means such that as said movable frame means moves in said backward direction away from said roller means a second end of each of said movable arm means moves in an arcuate manner toward said roller means;
a plurality of roller locking means each one of which is rotatably coupled at a first end thereof to said second end of one of said movable arm means such that said arcuate motion of said movable arm means causes a second end of each of said locking means to move in a forward direction towards said roller means, said second end of each of said locking means engaging with one of said roller supporting members to substantially prevent said lateral movement of said roller supporting member;
device compression means comprising two opposed horizontally disposed planar bearing members and also a vertically disposed planar member which is joined along at least one edge to a top surface of each of said bearing members, a bottom surface of each of said bearing members being oppositely disposed one to another and having a shape adapted for engaging a top and a bottom surface of said device therebetween, said compression means further comprising biasing means for urging said bottom surface of each of said bearing members toward one another to securely engage said device therebetween, each of said vertically disposed planar members being movably coupled to said movable frame means such that said backwards motion of said movable frame means urges each of said planar bearing members toward one another; and
device stop means having an interiorly disposed opening having a shape operable for receiving therein at least a portion of said side surfaces of said device, said device stop means being disposed relative to said roller means for defining said furthest extent of insertion of said device.

12. A receptacle as defined in claim 11 for a device having a nonsymmetrical horizontally planar shape and wherein each of said roller means further comprises biasing means for urging said rollers against said side surfaces of said device.

13. A receptacle as defined in claim 11 wherein said movable frame means comprises:
a substantially U-shaped member having a vertical member and a first and a second horizontally disposed forward projecting members extending therefrom, each of said forward projecting members having an end having a substantially right angle projection extending therefrom;
a third horizontally disposed forward projecting member extending from a centrally disposed portion of said vertical member, a forward end of said third member being attached to a rear surface of said device front surface engaging means; and a pin projecting upwardly from said third member from a rearwardly disposed portion of said third member proximal to said vertical member, said pin rotatably coupling said plurality of movable arm means to said movable frame means.

14. A receptacle as defined in claim 13 wherein each of said ends having a substantially right angle projection is disposed within an elongated diagonal slot within said vertically disposed planar members for movably coupling each of said device compression means to said movable frame means, each of said ends being slideably coupled to one of said movable frame means causes each of said ends to slide upwardly in one of said slots, thereby urging said planar bearing members towards one another.

15. A receptacle as defined in claim 14 wherein a front surface of said device engaging means has an indentation made therein for engaging said front surface of said device.

16. A receptacle as defined in claim 15 for a device having nonsymmetrical front, back and side surfaces having an upper surface portion defined by a first radius of curvature and a lower surface portion defined by a second radius of curvature and wherein said indentation has a variably contoured shape for receiving said front side surface therein in only a single orientation.

17. A receptacle as defined in claim 16 wherein each of said rollers has a variably contoured shape for engaging said nonsymmetrical side surface of said device in only a single orientation.

18. A receptacle as defined in claim 11 further comprising device ejecting means coupled to said movable frame means for moving said movable frame means and said device front surface engaging means in a forward direction towards said roller means whereby said device passes back through said rollers and out of said receptacle.

19. A receptacle as defined in claim 18 wherein said device ejecting means comprises a member adapted for linear motion in a direction substantially opposite to said motion of said movable frame means during said insertion of said device, said member being coupled to said movable frame means for moving said frame means.

20. A receptacle as defined in claim 19 wherein said cartridge ejecting means further comprises activation means for activating said ejecting means only at a desired time.

21. A method of securely retaining a device within a value printing system to prevent the inadvertent or intentional removal of the device, comprising the steps of:

providing the device with an symmetrical horizontally planar shape having a widest portion offset from a transverse centerline of the device and inwardly tapering edges such that a front edge of the device is narrower than a back edge of the device;

providing a receptacle for retaining the device within, said receptacle having an opening for inserting the device therethrough;

inserting the front edge of the device through the opening such that side surfaces of the device pass between a pair of rollers, each of the rollers being coupled to a biased support member for urging the rollers towards one another for continuously engaging the side surfaces of the device, the rollers passing over the widest portion of the device and coming to rest adjacent to the back edge of the device; and locking each of the roller supports to substantially prevent the further motion of the rollers whereby the rest position of the rollers impedes the withdrawal of the device through the opening.

22. A method as defined in claim 21 further comprising the step of:

capturing the device between a pair of opposed plate-like bearing members, one of the members bearing against a top surface of the device and the other member bearing against a bottom surface of the device.

23. A method as defined in claim 22 wherein each of the plate-like members has an asymmetrical horizontally planar shape which is substantially equal to the shape of the device whereby the step of capturing results in the top and bottom surface areas of the device being substantially entirely contained between the plate-like members.

24. A method as defined in claim 21 further comprising the step of energizing a device release means, the device release means unlocking the roller supports and pushing the device back out of the opening between the rollers.

25. A method as defined in claim 21 wherein the step of providing a device further comprises the step of providing the device with an asymmetrical contoured side edge surface and wherein the step of inserting is facilitated by providing each of the rollers with an asymmetrically contoured rolling surface having a shape predetermined to engage the contoured side surface of the device in only a single desired orientation of the device.

* * * * *